of text.

UNITED STATES PATENT OFFICE.

MAXIMILIAN MAYER, OF ORANGE, JOSEPH N. WIGGIN, OF EAST ORANGE, AND JOHN D. WIGGIN, OF MONTCLAIR, NEW JERSEY, ASSIGNORS TO H. B. WIGGIN'S SONS COMPANY, OF BLOOMFIELD, NEW JERSEY, A CORPORATION OF NEW JERSEY.

PLASTIC.

1,360,130.      Specification of Letters Patent.      Patented Nov. 23, 1920.

No Drawing.      Application filed April 19, 1919. Serial No. 291,347.

*To all whom it may concern:*

Be it known that we, (1) MAXIMILIAN MAYER, (2) JOSEPH N. WIGGIN, and (3) JOHN D. WIGGIN, citizens of the United States, residing at (1) Orange, (2) East Orange, (3) Montclair, all in the county of Essex and State of New Jersey, have invented a certain new and useful Plastic, of which the following is a specification.

The object of our invention has been to provide a plastic and a retarder to control the setting of plastics, which, while adapted for other uses, shall be especially adapted for forming or surfacing walls and which shall have among other advantages that the plastic shall be chemically neutral; shall be stronger than ordinary mixtures or plaster of Paris; shall be capable of having its time of setting controlled and lengthened; shall not be easily injured by chemicals to which walls are ordinarily liable to be exposed; shall be capable of being washed for the purpose of cleansing; shall be securely anchored to the face of the wall; shall not be easily injured by blows; shall form a good foundation on which to apply wall papers, paints or other coverings; shall be easily applied to a wall, and can be shipped in a dry state, completely mixed, prepared for use upon merely adding cold water; and to such ends our invention consists in the plastic and retarder for plastics hereinafter specified.

While we shall disclose our invention by the best embodiment thereof known to us, our invention is capable of embodiment in many different forms and by the use of various ingredients and in different proportions and is, therefore, not to be confined to the embodiment chosen for illustration.

The embodiment by which we shall illustrate our invention is especially adapted for use as a coating for walls, but it is capable of use for many other purposes. It consists of plaster of Paris having incorporated therewith a mixture of ingredients which may be termed a retarder and which, among other purposes, serves that of retarding or controlling the setting of the plaster of Paris when water is added thereto, it being desirable to delay the setting sufficiently so that there will be ample time to apply the plastic to the wall or other situation where it is to be used without having the plastic harden sufficiently to interfere with its being applied, as, for instance, with a trowel. It is also desirable to accomplish this result without introducing certain faults possessed by previously known retarders, and, on the other hand, to have the retarder give to the plastic certain very desirable qualities hereinafter mentioned.

The retarder mixture which we prefer to use consists of the following ingredients:

| | |
|---|---|
| Talc | 200 pounds, |
| Cold water paste | 6 pounds, |
| Gum karaya #1 | 1 pound, |
| Cold water glue | 4 pounds, |
| Boric acid | 1 pound. |

Such a mixture when incorporated in the plaster of Paris, a proper amount of water being present, will act as a retarder for the plaster, the degree of retardation being controllable by varying the proportion of the retarder to the plaster of Paris.

The retarder mixture may either be mixed with water before adding the plaster, or, as we prefer, it may be mixed with the plaster and shipped in a dry condition, ready as a whole to be mixed with water and applied to the wall or other surface.

To form what is known as a hard-finish plaster for walls, one part by measure of the retarder should be mixed with five parts of the plaster of Paris; or 1200 pounds of plaster of Paris may be mixed with the weight or retarder ingredients above stated. Two parts of the mixture of plaster of Paris and retarder are preferably mixed with one part by measure of water. For what is known as a sand-finish, ten parts of sand should be added to the said mixture of one part of retarder and five parts of plaster.

The function of the gum karaya is to give a buttery quality or slip to the plaster, to make it more easily spread with a trowel.

The boric acid is an antiseptic.

The talc makes the plastic work smoothly under the trowel in applying it to a wall. Either the gum karaya or the talc could be omitted without entirely destroying the usefulness of our plastic.

The glue and paste tend to strengthen and toughen the plastic and they, like other colloids, tend to retard the setting of the plaster. As the glue and paste are both retarders, either one could be omitted from our plastic and it would still be useful for the purposes intended.

It is not absolutely necessary to have all of the ingredients present in order to make a desirable plastic.

The plastic which we disclose can be used for a white finishing coat on a wall or other surface and results in a surface that is chemically neutral, so that fabrics, wall-paper, paints or distemper color, with or without coloring matter, will not be attacked by any of the ingredients contained in the plastic. This makes it practical to decorate the wall as soon as dry. On the other hand, the customary use of lime and plaster of Paris for the white finishing coat results in a wall which is strongly alkaline and has either to be neutralized with acid or left for many months to be neutralized by the atmosphere.

While our plastic sets properly, the time of setting can be controlled by varying the proportion of the colloidal matter, so that an extended wall space can be covered before the plaster has begun to set too much to spread properly. On the other hand, the ordinary mixture of plaster of Paris and water used for filling cracks, etc., sets so rapidly that it is impractical to economically finish a large area in that way.

Our plastic also is of greater strength than the ordinary plaster of Paris mixtures.

Our plastic is especially adapted for locations where disinfectants or acids are used, as it is not affected by sulfuric acid of 5% strength nor by carbolic acid of 10% strength. On the contrary, acid discolors the lime in ordinary plaster of Paris mixtures and so discolors the walls.

Our plastic will withstand the action of boiling water without softening, and this quality enables a wall made with our plastic to be washed with hot water and soap. This is not practical with the ordinary plaster wall.

Our plastic will adhere firmly to the face of old walls, which is not ordinarily true of the mixture of plaster of Paris and lime.

Our plastic can be used for filling cracks in walls and tends to avoid the stain of discoloration which occurs in old plaster adjacent to the cracks when an ordinary mixture of plaster of Paris is used to fill the cracks. As it expands slightly in drying, it also completely fills the cracks leaving no crevices between the filling and the walls of the cracks.

A wall covered with our plastic is of such strength that it is not easily marred by furniture, and even when marred does not usually crumble.

A wall surfaced with our plastic has sufficient density of surface so as not to require sizing before pasting wall paper upon it.

As before stated, our plastic can be completely mixed and shipped in dry form and can be made ready for use by the mere addition of cold water to it.

We claim:

1. A plastic comprising plaster of Paris, cold water glue and cold water paste, the plaster of Paris being more than 95% of the mixture.

2. A plastic comprising plaster of Paris, glue and a substance which when the mixture is wet with water will give it smoothness, the plaster of Paris being approximately five-sixths of the mixture.

3. A plastic comprising plaster of Paris, glue and gum karaya.

4. A plastic comprising plaster of Paris, glue and gum karaya, the glue and gum karaya being approximately one per cent. of the mixture.

5. A plastic comprising plaster of Paris, glue, a slip-giving agent, a substance which when the mixture is wet with water will give it smoothness, the plaster of Paris being approximately five-sixths of the mixture.

6. A plastic comprising plaster of Paris, glue and paste, the plaster of Paris being at least five-sixths of the mixture.

7. A plastic comprising plaster of Paris, cold water glue and cold water paste, the plaster of Paris being at least five-sixths of the mixture.

8. A plastic comprising plaster of Paris, glue and a substance which when the mixture is wet with water will give it smoothness, the plaster of Paris being at least five-sixths of the mixture.

9. A plastic comprising plaster of Paris, glue and gum karaya, the plaster of Paris being at least five-sixths of the mixture.

10. A plastic comprising plaster of Paris, glue and an antiseptic, the plaster of Paris being at least five-sixths of the mixture.

11. A plastic comprising plaster of Paris, glue and boric acid, the plaster of Paris being at least five-sixths of the mixture.

12. A plastic comprising plaster of Paris, glue, a softening agent, a substance which when the mixture is wet with water will give it smoothness, the plaster of Paris being at least five-sixths of the mixture.

13. A plastic comprising at least 90% of plaster of Paris, cold water paste and cold water glue.

14. A plastic comprising approximately 99 parts by weight of plaster of Paris and one part by weight of paste and glue.

15. A plastic comprising approximately 99 parts by weight of plaster of Paris and one part by weight of cold water paste and cold water glue.

16. A plastic comprising approximately 99 parts by weight of plaster of Paris and one part by weight comprised of paste, glue and a softening agent.

17. A plastic comprising approximately 80 parts by weight of plaster of Paris and one part by weight comprised of paste, glue and a slip-giving agent.

18. A plastic comprising approximately four parts by volume of plaster of Paris and one part by volume consisting of talc, paste, glue, gum karaya and boric acid.

19. A plastic comprising approximately 1200 pounds plaster of Paris, 200 pounds of talc, 6 pounds of cold-water paste, 1 pound of gum karaya, 4 pounds of cold-water glue.

20. A mixture for controlling the crystallization and consistency of calcined mineral matter comprising cold-water glue and talc.

21. A mixture for controlling the crystallization and consistency of calcined mineral matter comprising glue, paste and talc.

22. A mixture for controlling the crystallization and consistency of calcined mineral matter comprising cold-water glue, cold-water paste and talc.

23. A mixture for controlling the crystallization and consistency of calcined mineral matter comprising glue, talc and a gum.

24. A mixture for controlling the crystallization and consistency of calcined mineral matter comprising glue, talc and gum karaya.

25. A mixture for controlling the crystallization and consistency of calcined mineral matter comprising glue, paste, talc and gum karaya.

26. A mixture for controlling the crystallization and consistency of calcined mineral matter comprising a large proportion of talc and a relatively small proportion of glue.

27. A mixture for controlling the crystallization and consistency of calcined mineral matter comprising a large proportion of talc and a relatively small proportion of glue and paste.

28. A mixture for controlling the crystallization and consistency of calcined mineral matter comprising a large proportion of talc and a relatively small proportion of glue, paste and gum karaya.

29. A plastic comprising plaster of Paris, talc, gum karaya and a retarder.

30. A dry powdered plaster mixture comprising plaster of Paris, a slip-giving ingredient, cold-water glue and paste.

31. A dry powdered plaster mixture containing a slip-giving ingredient, glue and paste.

32. A mixture for controlling the crystallization and consistency of plaster of Paris comprising a dry lubricant, an organic substance which will give a greasy or unctuous quality, and a retarder.

33. A mixture for controlling the crystallization and consistency of plaster of Paris comprising talc and an organic substance which will give a greasy or unctuous quality and a retarder.

34. A mixture for controlling the crystallization and consistency of plaster of Paris comprising a dry lubricant, a gum or mucilaginous substance and a retarder.

35. A mixture for controlling the crystallization and consistency of plaster of Paris comprising a dry lubricant, gum karaya and a retarder.

In testimony that we claim the foregoing, we have hereunto set our hands this 17th day of April, 1919.

MAXIMILIAN MAYER.
JOSEPH N. WIGGIN.
JOHN D. WIGGIN.